United States Patent [19]

Murase et al.

[11] 4,261,215

[45] Apr. 14, 1981

[54] VARIABLE PITCH TYPE V-PULLEY

[75] Inventors: Hisao Murase; Mototaka Nakane, both of Toyota, Japan

[73] Assignee: Aisin Seiki Company, Limited, Toyota, Japan

[21] Appl. No.: 37,883

[22] Filed: May 10, 1979

[30] Foreign Application Priority Data

May 24, 1978 [JP] Japan .............................. 53-61896[U]

[51] Int. Cl.$^3$ .............................................. F16H 55/52
[52] U.S. Cl. .......................................... 474/13; 474/46
[58] Field of Search ................ 74/230.17 R, 230.17 B, 74/230.17 C, 230.17 D, 230.17 E, 230.2

[56] References Cited

U.S. PATENT DOCUMENTS

| 2,155,351 | 4/1939 | Paulus | 74/230.17 R |
| 3,283,600 | 11/1966 | Buck | 74/230.17 R |
| 3,850,050 | 11/1974 | Lemmens | 74/230.17 E X |
| 4,010,654 | 3/1977 | Maucher et al. | 74/230.17 C |
| 4,020,711 | 5/1977 | Woollard | 74/230.17 E |
| 4,095,479 | 6/1978 | Lundberg | 74/230.17 E |

FOREIGN PATENT DOCUMENTS

| 682193 | 3/1964 | Canada | 74/230.17 R |
| 1802750 | 6/1970 | Fed. Rep. of Germany. | |
| 601986 | 2/1960 | Italy | 74/230.17 R |
| 159169 | 1/1979 | Netherlands | 74/230.17 E |

Primary Examiner—C. J. Husar
Assistant Examiner—Moshe I. Cohen
Attorney, Agent, or Firm—Oblon, Fisher, Spivak, McClelland & Maier

[57] ABSTRACT

A V-pulley of variable pitch type for a drive acting through a tension medium strand includes two sheaves, at least one of which is displaceable in an axial direction relative to the other, each sheave having a running surface for a tension medium strand such as, for example, V-belts, at least one of the sheaves being mounted on a shaft-like member, at least two systems having means mutually connecting the sheaves to each other, the at least two systems being axially spaced from each other. Thus at least one system allows axial displacement of the one sheave linked thereto, and the other system is firmly linked to the other sheave. Two linked portions of the systems are located radially outside with respect to the running surfaces of the sheaves, thereby obtaining friction-free and wear-free entrainment and guidance of the movable sheave, and especially entrainment and guidance without the occurrence of fatigued corrosion to link means.

7 Claims, 2 Drawing Figures

VARIABLE PITCH TYPE V-PULLEY

BACKGROUND OF THE INVENTION

1. Field of the Invention

This invention relates to variable-pitch pulley assemblies for use with tension medium strand such as V-belt, which also may include speed sensitive means.

2. Description of the Prior Art

In the prior art, for example, West German Pat. OLS 1802750 shows an expansible pulley having one movable sheave and one fixed sheave on the shaft. The movable sheave is movable relative to the fixed sheave in an axial direction. Both sheaves are secured against rotation relative to one another by means such as a keyway or splines. Each sheave has a running surface for the tension medium strand such as a V-belt which is only partly or semi-circularly looped around the sheaves which produces a tilting or tipping movement which acts upon the keyway or the splines and counteracts the axial displacement. Therefore, the movement of the movable sheave is likely to cause wear on the key or splines.

U.S. Pat. No. 4,010,654 shows a variable-pitch pulley of the foregoing type wherein the foregoing drawbacks are eliminated. Disclosed in this prior art is a V-pulley of variable pitch type which includes two sheaves, at least one of which is displaceable in an axial direction relative to the other, each of the sheaves having a running surface for a V-belt. One of the sheaves is mounted on a shaft-like member with the two systems having means mutually connecting the sheaves to each other and being axially spaced from each other and linked to both sheaves such that one system affords axial displacement of one sheave and the other system is firmly linked to the other sheave. However, two linked portions of the systems are located radially inside with respect to the running surface of the sheaves. As a result, the stroke of each sheave is not sufficient and the pitch of the pulley may not be controlled.

SUMMARY OF THE INVENTION

An object of this invention is to provide a V-pulley of variable pitch type wherein the foregoing drawbacks are eliminated.

A further object of the invention is to provide a variable-pitch pulley which will realize friction-free and wear-free entrainment and guidance of the movable sheave, and especially entrainment and guidance without the occurrence of fretting corrosion.

According to the invention, two systems having link means mutually connecting the sheaves to each other are axially spaced from each other, permit axial displacement of the movable sheave and are located radially outside with respect to the running surface of the pulley.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENT

Figure 1:
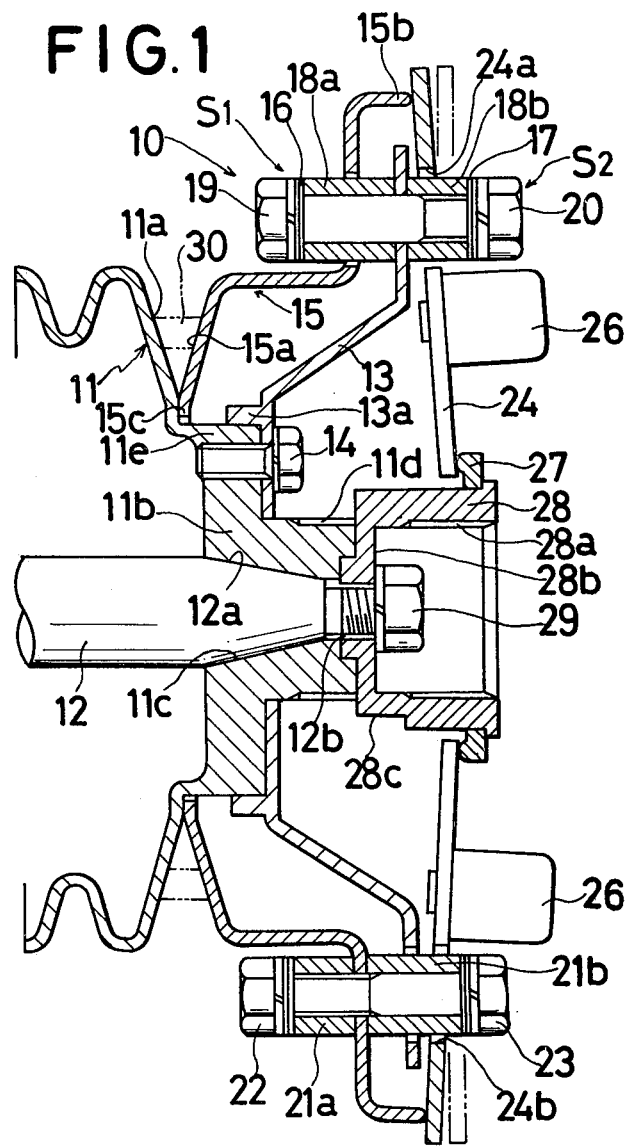
FIG. 1 is a sectional view of the variable pitch type V-pulley of the present invention.
Figure 2:
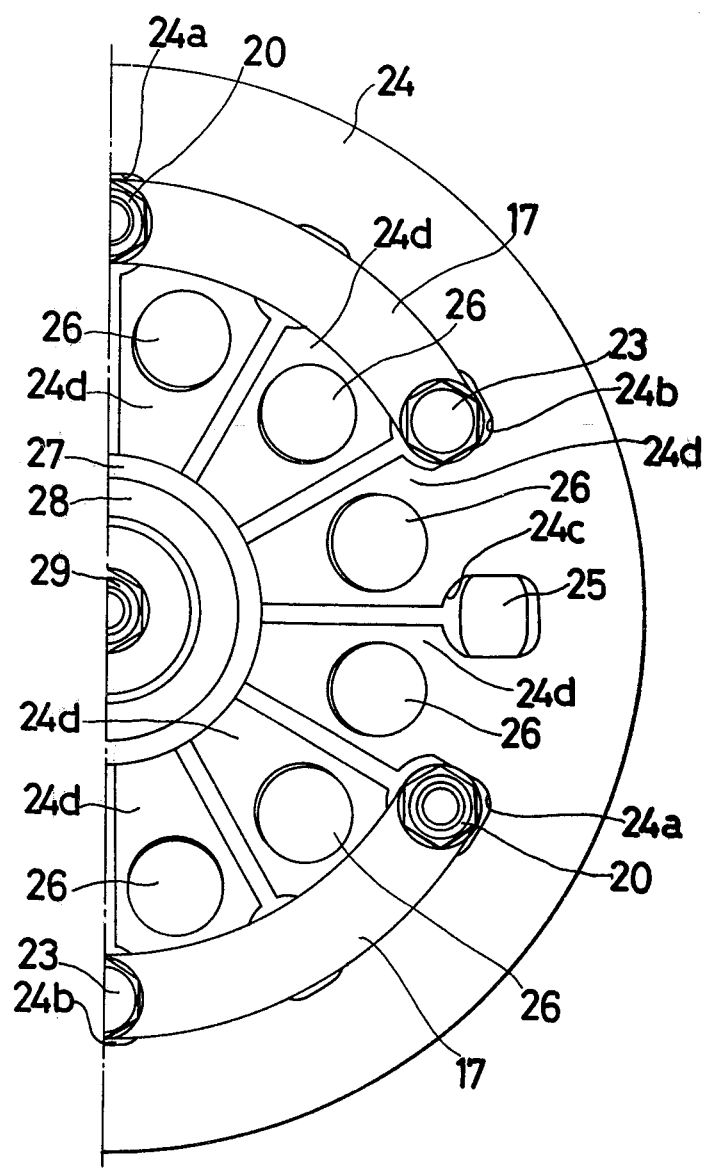
FIG. 2 is a partial side view of the V-pulley of FIG. 1.

A V-pulley assembly of variable pitch type is illustrated generally at 10 wherein one sheave 15 is movable axially with respect to an axially fixed sheave 11. The assembly 10 is mounted directly onto a shaft 12, such as an engine output shaft or drive shaft. The sheave 11 has a running surface 11a and a boss portion 11b. The boss portion 11b has an inner tapered portion 11c formed therein and a male screw threaded portion 11d formed thereon. The shaft 12 has a tapered portion 12a mating with the inner tapered portion 11c formed in the boss portion 11b and is held in place with suitable nut 29 which will act against the boss portion 11b onto the tapered portion 12a.

An axially fixed or stationary member 13 is fixed to the boss portion 11b of the sheave 11 by screw or nut 14. The movable sheave 15 has a running surface 15a and is connected, being fixed against relative rotation, to the stationary sheave 11 by means of two systems $S_1$ and $S_2$ which include leaf spring elements 16 and 17, each being circumferentially disposed by three pieces in the force transmission path between the two sheaves 11 and 15. The leaf spring elements 16 and 17 are located with an axial spacing from one another by the spacers 18a, 18b and 21a, 21b.

Three spacers 18a, which are provided at the outer periphery of the stationary member 13, extend in an axial direction through movable sheave 15. The three spacers 21b, which are provided at the outer periphery of the movable sheave 15, extend in an axial direction through the stationary member 13. Each spacer 18a and one end of each leaf spring 16 are fixed to the stationary member 13 by screws 19 and nuts 20. Each spacer 21a and the other end of each leaf spring 16 are fixed to the movable sheave 15 by screws 23 and nuts 22. Correspondingly, each spacer 18b and one end of each leaf spring 17 are fixed to the stationary member 13 by the screws 19 and nuts 20 while each spacer 21b and the other end of each leaf springs 17 are fixed to the movable sheave 15 by the screws 23 and nuts 22. The two leaf spring systems $S_1$ and $S_2$ are located at a corresponding position and the leaf springs 16 and 17 of the two systems are of equal length.

The two systems $S_1$ and $S_2$ are located radially outside with respect to the running surfaces 11a, 15a of the sheaves 11 and 15. Therefore, the leaf springs 16 and 17 permit sufficient displacement of the sheave 15 and are fixed in the rotational direction. The outer periphery of a diaphragm spring 24 abuts against the outer peripheral portion 15b of the movable sheave 15 and the inner periphery of the diaphragm spring 24 abuts against a support-ring 27.

The support ring 27 is mounted on a connecting member 28 which is fixed to the right end of the boss portion 11b by nut 29. The cylindrical periphery of member 28 is provided with a female screw thread 28a adapted to the male screw thread 11d of boss portion 11b. The outer periphery of the connecting member 28 has a flat portion 28c which can be adapted to screw the connecting member 28 onto the male screw threaded portion 11d of the boss portion 11b by a suitable screw wrench after taking off the connecting member 28 from the right end of the boss portion 11b and then screwing the nut 29 on the male screw threaded portion 12b of the shaft 12.

If the connecting member 28 is screwed on the male screw threaded portion 11d after the inner surface 28b of connecting member 28 abuts against the right end of the nut 29, the V-pulley assembly can be disjointed from the shaft 12. The diaphragm spring 24 has twelve slits and twelve holes 24a, 24b, 24c connecting each slit. The three sets of spacers 18b and 21b extend in an axial direction through the three sets of holes 24a and 24b respectively.

The stationary member 13 is provided with three pawl members 25 which are firmly engaged in the three holes 24c of diaphragm spring 24, respectively, and are synchronously and concentrically rotatable with respect to the stationary member 13 and permit axial movement of the diaphragm spring 24.

Suitable weight members 26 are attached to the lever portion 24d of the diaphragm spring 24 adjacent to the outer ends thereof. The weight members and the lever portions 24d act as the centrifugal force actuators and speed responsive means. It is to be noted that the weight 26 is not necessarily provided. When the speed responsive pulley illustrated in FIG. 1 is actually used, the counter pulley is a torque responsive pulley which has no weight.

A V-belt 30 is looped around the speed responsive pulley 10 and the torque responsive pulley, not shown. Therefore, the speed responsive pulley 10 drives the torque responsive pulley when the shaft 12 is driven by the engine and the like.

The operation of the speed responsive pulley, which is actuated as a drive side is described hereinbelow. As the speed responsive pulley 10 initiates rotation with the belt 30 which is positioned down in a non-driving position of the running surfaces 11a and 15a of both sheaves 11 and 15, rotation of the shaft 12 will cause the weight 26 to tend to be positioned radially outwardly. This will cause the outer periphery of the diaphragm spring 24 to be pushed in the leftward direction in FIG. 1 forcing the movable sheave 15 axially along the boss portion 11b toward the stationary sheave 11. The rotational speed of the shaft 12 will shift the position of the sheave. The belt-driving speed will depend on the force of the spring 24 and centrifugal force of the weight 26. As the rotation of the speed responsive pulley increases, the movable sheave 15 will move axially (leftward) with respect to the stationary sheave 11 from the position in which the sheave 15 abuts the stopper 13a of the stationary member 13.

Therefore, the diameter of the running surface for the V-belt increases and the speed of the V-belt increases. As the diameter of the running surface of the speed responsive pulley 10 increases, the diameter of the running surface of the torque responsive pulley decreases by moving the movable sheave of the torque responsive pulley against the force of the diaphragm spring. Thus, the speed ratio between the speed responsive pulley and the torque responsive pulley increases.

In the above operation, if the movable sheave is moved to the left, the leaf springs 16 and 17 are distorted in the axial direction but in this invention the leaf springs 16 and 17 are long enough not to cause excessive distortion.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States of America is:

1. A pulley assembly for a tension medium strand comprising:
   a shaft;
   a stationary sheave and a movable sheave, each of said sheaves comprising a running surface of the pulley assembly, said stationary sheave being connected to said shaft and said movable sheave being mounted for movement axially relative to said stationary sheave in a direction toward and away from the stationary sheave to define a variable width V-belt groove between said sheaves, said stationary sheave including a boss portion formed thereon;
   a stationary member secured to said boss portion extending outwardly from said running surface in a generally radial direction; and
   first and second means, interconnecting said movable sheave to said stationary sheave via the extending portion of said stationary member, axially spaced from each other for permitting axial displacement of said movable sheave.

2. A pulley assembly according to claim 1, further comprising a diaphragm spring for engaging said movable sheave and biasing said movable sheave axially relative to said stationary sheave in a direction toward said stationary sheave.

3. A pulley assembly according to claim 2, said diaphragm spring including slits provided at the inner periphery thereof and holes connected to said slits.

4. A pulley assembly according to claim 3, said first and second means for permitting axial displacement of said movable sheave being interconnected through said holes of said diaphragm spring.

5. A pulley assembly according to claim 4, further comprising a plurality of weight members connected to said diaphragm spring and acting as centrifugal force actuators and speed responsive means.

6. A pulley assembly according to claim 1, said first and second means for permitting axial displacement of said movable sheave each comprising a leaf spring element, a spacer member and a securing member.

7. A pulley assembly according to claim 5, said first and second means for permitting axial displacement of said movable sheave each comprising a leaf spring element, a spacer member and a securing member.

* * * * *